United States Patent [19]

Takehara et al.

[11] Patent Number: 5,251,134
[45] Date of Patent: Oct. 5, 1993

[54] SUSPENSION SYSTEM FOR AUTOMOTIVE VEHICLE

[75] Inventors: Shin Takehara; Toshiki Morita; Kenji Hamada, all of Hiroshima, Japan

[73] Assignee: Mazda Motor Corporation, Hiroshima, Japan

[21] Appl. No.: 722,821

[22] Filed: Jun. 28, 1991

[30] Foreign Application Priority Data

Jun. 28, 1990 [JP] Japan ................................ 2-170643

[51] Int. Cl.$^5$ ............................................. B60G 17/08
[52] U.S. Cl. ............................... 364/424.05; 280/707; 280/840
[58] Field of Search .................... 364/424.05; 280/703, 280/707, 840

[56] References Cited

U.S. PATENT DOCUMENTS

| | | | |
|---|---|---|---|
| 4,797,823 | 1/1989 | Ikemoto et al. | 364/424.05 |
| 4,809,176 | 2/1989 | Oowa et al. | 364/424.05 |
| 4,869,528 | 9/1989 | Buma et al. | 280/707 |
| 4,937,748 | 6/1990 | Yonekawa et al. | 364/424.05 |
| 5,016,907 | 5/1991 | Akatsu et al. | 280/707 |
| 5,119,297 | 6/1992 | Buma et al. | 280/707 |

Primary Examiner—Gary Chin
Attorney, Agent, or Firm—Fish & Richardson

[57] ABSTRACT

A cylinder unit for adjusting a vehicle height of the vehicle body is interposed separately or independently between the vehicle body and each wheel. The supply and discharge of the operating fluid to and from each of the cylinder units is performed by generating a control signal indicative of the quantity of supplying and discharging the operating fluid to and from the flow rate adjusting valves. The control signal is determined so as to allow an actual angle of a roll of the vehicle body to agree with a target angle of the roll thereof. When the automotive vehicle is cornering, particularly rapidly, the control signal is corrected in such a manner that the larger the inner pressure of the cylinder unit, the smaller the quantity of the operating fluid to be supplied or to be discharged. Specifically, the correction is made so as to minimize the quantity of the operating fluid to be supplied to or to be discharged from the cylinder unit on the outer wheel side upon cornering, which has a higher inner pressure, and to maximize the quantity of the operating fluid to be supplied to or to be discharged from the cylinder unit on the inner wheel side upon cornering, which has a lower inner pressure.

18 Claims, 7 Drawing Sheets

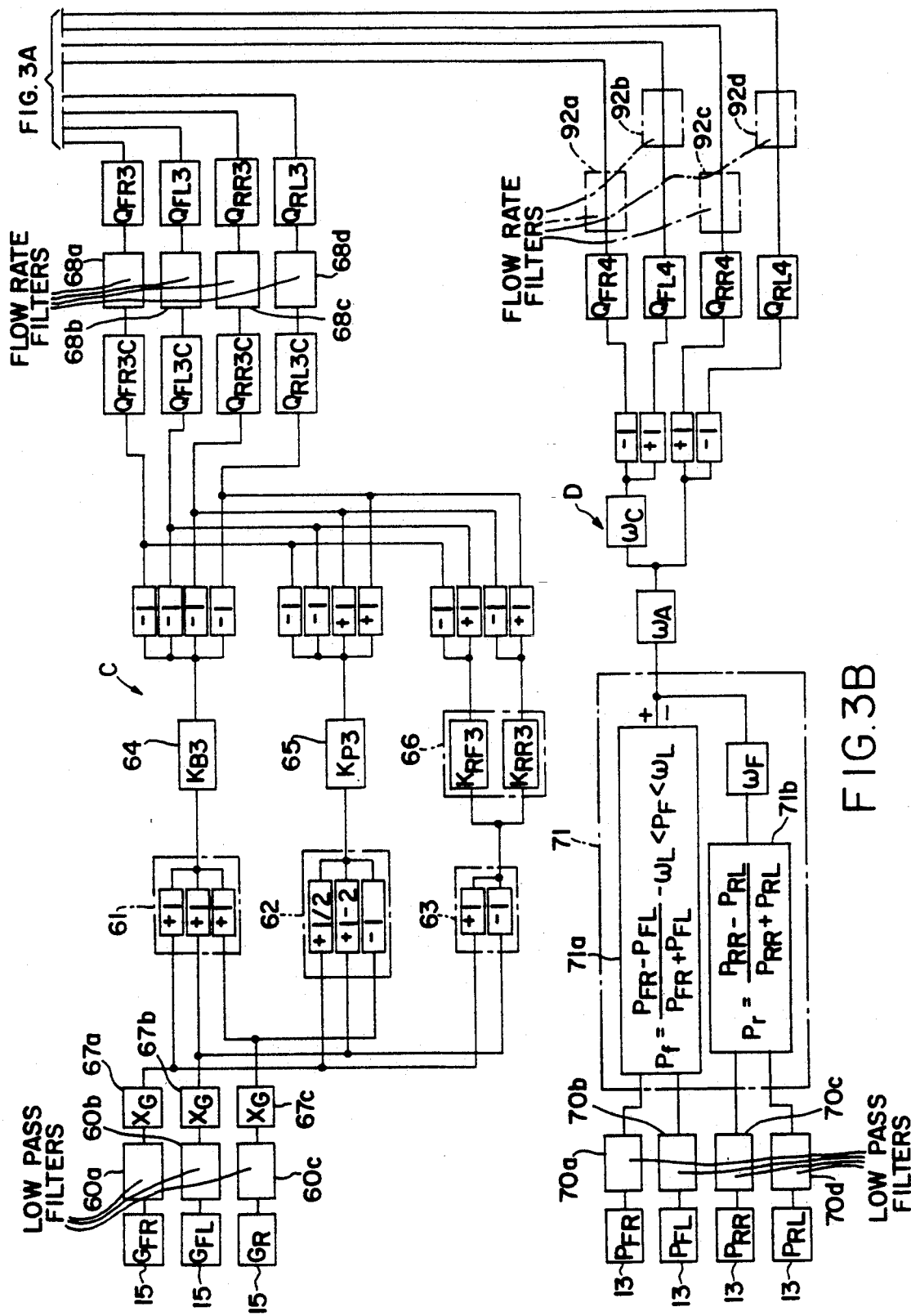

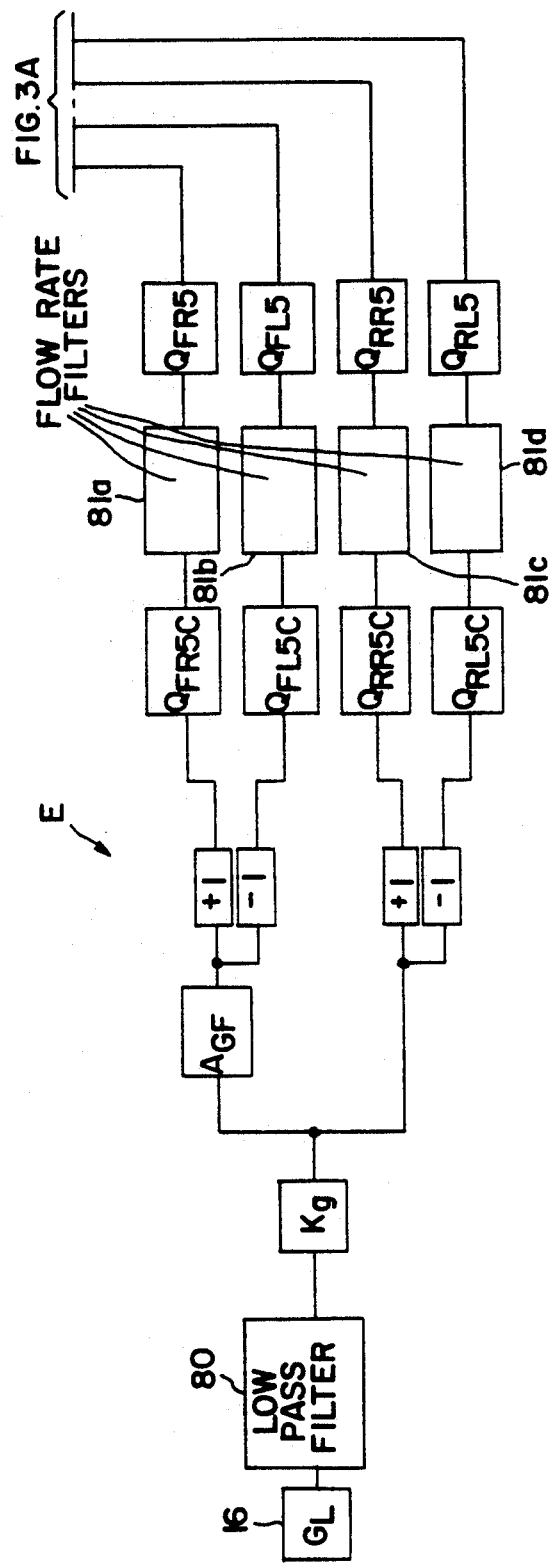

SUSPENSION SYSTEM FOR AUTOMOTIVE VEHICLE

BACKGROUND OF THE INVENTION

1. Field of the Invention

The present invention relates to a suspension system for an automotive vehicle and, more particularly, to a suspension system for an automotive vehicle so adapted as to control an angle of a roll, i.e. a rolling angle, of the vehicle body by supplying or discharging operating fluid to or from a cylinder interposed between the vehicle body and each of the wheels.

2. Description of the Related Art

For example, as disclosed in Japanese Patent Laid-open Publication (kokai) No. 130,418/1988, there is known a suspension system of the automotive vehicle which allows the vehicle height of the vehicle body to be alterable by controlling the supply or discharge of operating fluid to or from a liquid pressure cylinder interposed between the vehicle body and each of the wheels.

A so-called active control suspension system of this kind is arranged to absorb vibration of a low frequency from a road surface by basically changing the vehicle height of the vehicle body. On the other hand, generally, vibration of a high frequency is absorbed by a gas spring inserted through a liquid pressure chamber of the liquid pressure cylinder. Japanese Patent Laid-open Publication (kokai) No. 38,130/1990 discloses such an active control suspension system with the gas spring. This active control suspension system can suppress the vehicle body from rolling during cornering so as to make a rolling angle of the vehicle body zero or substantially zero. In other words, when the vehicle body is cornering, the operating fluid is supplied to the liquid pressure cylinder on the outer wheel side or discharged from the liquid pressure cylinder on the inner wheel side, thereby making the vehicle height of the vehicle body on the outer wheel side equal to the vehicle height thereof on the inner wheel side.

Heretofore, in order to suppress the vehicle body from rolling, the quantity of the operating fluid to be supplied to the liquid pressure cylinder on the outer wheel side is set to become equal to the quantity of the operating fluid to be discharged from the liquid pressure cylinder on the inner wheel side.

This arrangement, however, may sometimes raise the vehicle height of the vehicle body on the outer wheel side to the contrary, in particular when the vehicle body is cornering at a sharp angle.

SUMMARY OF THE INVENTION

Therefore, the present invention has the object to solve the problem that the vehicle height of the vehicle body on the outer wheel side is raised during sharply cornering and to provide a suspension system for the automotive vehicle capable of suppressing the vehicle body from rolling at a rolling angle of substantially zero.

In order to achieve the aforesaid object, the present invention consists of a suspension system for an automotive vehicle, comprising:

a cylinder unit so interposed independently and separately between a vehicle body and each of wheels as to adjust a vehicle height of the vehicle body in accordance with supply or discharge of operating fluid;

flow rate adjusting means for supplying or discharging the operating fluid to or from the cylinder unit;

roll controlling means for generating a control value to the flow rate adjusting means so as to allow an actual angle of a roll of the vehicle body to agree with a target angle of the roll of the vehicle body;

inner-pressure detecting means for detecting an inner pressure of the cylinder unit;

cornering detecting means for detecting cornering of the automotive vehicle; and correcting means for correcting the control value so as to make a quantity of the operating fluid to be supplied or to be discharged smaller as the inner pressure detected by the inner pressure detecting means gets larger, when the cornering of the automotive vehicle is detected by the cornering detecting means.

It is to be noted herein that the relationship between the piston stroke amount of the liquid pressure cylinder (in the direction in which the operating fluid within the liquid pressure cylinder is contracted) and the inner cylinder pressure Ps in a state in which no operating fluid is supplied or discharged is represented basically by such a characteristic that the inner cylinder pressure Ps becomes larger as the piston stroke amount gets larger. It is further to be noted that the inner cylinder pressure Ps corresponds to a spring constant K of the gas spring.

While the automotive vehicle is cornering, the inner pressure of the liquid pressure cylinder becomes larger on the outer wheel side than on the inner wheel side. Hence, when the operating fluid is supplied to the liquid pressure cylinder on the outer wheel side (on the side where the spring constant K is larger) in order to suppress the vehicle body from rolling, the piston is likely to move in a rebounding direction to a large extent, while the movement of the piston in a bumping direction is relatively small when the operating fluid is discharged from the liquid pressure cylinder on the inner wheel side (on the side where the spring constant K is smaller). In other words, this phenomenon causes the vehicle height of the vehicle body on the outer wheel side to become higher than on the inner wheel side.

As long as feedback control for supplying or discharging the operating fluid to or from the liquid pressure cylinders is normally carried out in order to suppress the automotive vehicle from rolling, the vehicle height of the vehicle body on the outer wheel side eventually becomes equal to the vehicle height thereof on the inner wheel side. However, particularly when the quantity of the operating fluid to be supplied to or to be discharged from the liquid pressure cylinders is set larger during sharply cornering, the difference in a behavior of the pistons may be reflected as it is as the difference between the vehicle height of the vehicle body on the outer wheel side and the vehicle height thereof on the inner wheel side. The foregoing has been found as causing the problem which involves raising the vehicle height of the vehicle body on the outer wheel side for automotive vehicles with such conventional active control suspension system in the manner as described hereinabove. Particularly, when the control of a roll is carried out so as to make a target rolling angle a reversed rolling angle, there may be the risk that the vehicle height of the vehicle body on the outer wheel side is raised to an extent larger than necessary.

On the other hand, the suspension system according to the present invention is to arranged as to set the quantity of the operating fluid to be supplied to or to be discharged from of the cylinders in such a manner that the quantity thereof becomes smaller as the inner cylinder pressure gets larger, when the automotive vehicle is cornering. Hence, when the vehicle body is cornering, a relatively small quantity of the operating fluid is supplied to the liquid pressure cylinder on the outer wheel side, while a relatively large quantity of the operating fluid is discharged from the liquid pressure cylinder on the inner wheel side, thereby allowing the difference in behavior of the pistons to be compensated and enabling the vehicle height of the vehicle body on the outer wheel side to agree with the vehicle height thereof on the inner wheel side.

Other objects, features and disadvantages of the present invention will become apparent during the course of the description of the preferred embodiments, which follows, in conjunction with the accompanying drawings.

BRIEF DESCRIPTION OF THE DRAWINGS

FIGS. 3(A), 3(B) and 3(C) are block diagrams showing a system disposed in the control unit for calculating the quantity of the supplying fluid.

DETAILED DESCRIPTION OF THE PREFERRED EMBODIMENTS

The present invention will be described more in detail with reference to the accompanying drawings. In the description which follows, reference symbols "F" and "R" denote front and rear, respectively, so that it is to be understood that, for example, wheels 2F and 2R refer to the wheels 2 located on the front (F) and rear (R) sides, respectively. Further, reference symbols "FL", "FR", "RL", and "RR" denote left-hand front, right-hand front, left-hand rear, and right-hand rear, respectively. It is thus to be understood that, for example, the wheel 2FL refers to the wheel 2 on the left-hand front side and the same can be applied to the rest.

Figure 1:
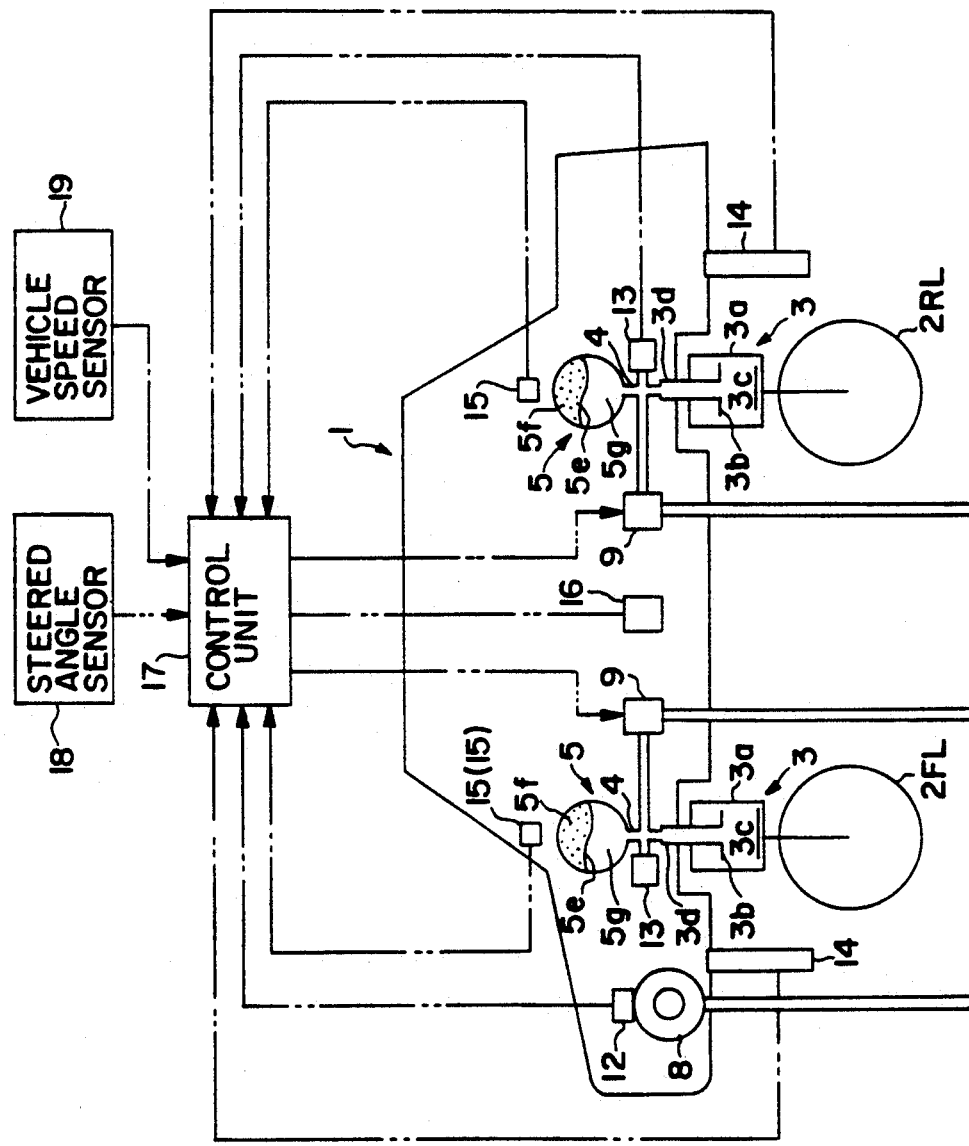
FIG. 1 is a schematic diagram showing an outline of the construction of the suspension apparatus of an automotive vehicle according to the present invention.

FIG. 1 shows an outline of the construction of a suspension apparatus of the automotive vehicle according to the present invention. It is to be noted herein that FIG. 1 indicates only the left side of the vehicle body 1, however, the portion of the vehicle body 1 on the right side has the same structure as the left-hand portion thereof. As shown in FIG. 1, a liquid cylinder unit 3 is interposed between a vehicle body 1 and a left-hand front wheel 2FL and another liquid cylinder unit 3 is interposed between the vehicle body 1 and a left-hand rear wheel 2RL. The liquid cylinder unit 3 comprises a cylinder body 3a connected at its lower end portion to a member on the wheel side and a piston 3b is inserted into the cylinder body 3a so as to form and define a liquid pressure chamber 3c within the cylinder body 3a. On an upper face of the piston (free piston) 3b is provided a piston rod 3d whose upper end portion is supported by the vehicle body 1. Each of the cylinder bodies 3a is connected to the left-hand front wheel 2FL or to the left-hand rear wheel 2RL. With this arrangement, the vehicle height is raised by expanding the piston 3b when the operating liquid is supplied to the liquid pressure chamber 3c and the vehicle height is lowered when the operating liquid is withdrawn from the liquid pressure chamber 3c.

To the liquid pressure chamber 3c of the liquid cylinder unit 3 is communicated a gas spring 5 through a connecting passage 4. The gas spring 5 is divided into a gas chamber 5f and a liquid pressure chamber 5g by a diaphragm 5e, and liquid pressure chamber 5g is communicated with the liquid pressure 3c of the liquid cylinder unit 3 through the connecting passage 4 and a passage disposed in the piston 3b of the liquid cylinder unit 3.

At the front end portion of the vehicle body 1 is disposed a hydraulic pump 8 drivable by an engine (not shown), and the hydraulic pump 8 is communicated with a liquid pressure pipe 10 having a proportional flow rate control valve 9 which in turn is so arranged as to adjust the flow rate of the operating liquid by controlling the supply or discharge of the operating liquid to or from the liquid cylinder unit 3.

The hydraulic pump 8 is provided with a discharge pressure sensor 12 for sensing the discharge pressure of the hydraulic pump 8 and liquid pressure sensors 13 and 13 for sensing the liquid pressure of the liquid pressure chamber 3c of each liquid pressure chamber 3.

Further, there are disposed vehicle height sensors 14 and 14 for sensing the vertical displacement of the vehicle body with respect to each of the wheels 2FL and 2RL, i.e. the vehicle height displaced at the respective left-hand front and rear wheels 2FL and 2RL, by detecting a cylinder stroke amount of each of the fluid cylinder units. A total of three vertical acceleration sensors 15, 15 and 15 are disposed on a nearly horizontal plane two of them are mounted in a position above the left-hand front wheel 2FL and the right-hand front wheel 2FL while the remaining one is mounted in a middle position in the widthwise direction of the vehicle body between the left-hand and right-hand rear wheels 2R. A transverse acceleration sensor 16 for sensing a degree of acceleration to be applied in the transverse direction of the vehicle body, a steered angle sensor 18 for sensing the steered angle of the steering wheel, and a vehicle speed sensor 19 for sensing the vehicle speed at which the automotive vehicle is running. The transverse acceleration sensor 16 is disposed at the position of the vehicle body 1 through which gravity passes.

The signals detected by the sensors 12, 13, 13, 14, 14, 15, 15, 15, 16, 18 and 19 are inputted into a control unit 17 having a central processing unit (CPU) and so on. The control unit 17 is so constructed as to perform operation in accordance with a predetermined program on the basis of the signals detected by these sensors and control the proportional flow rate control valves 9 and 9, thereby changing the suspension characteristics in a desired manner.

Figure 2:
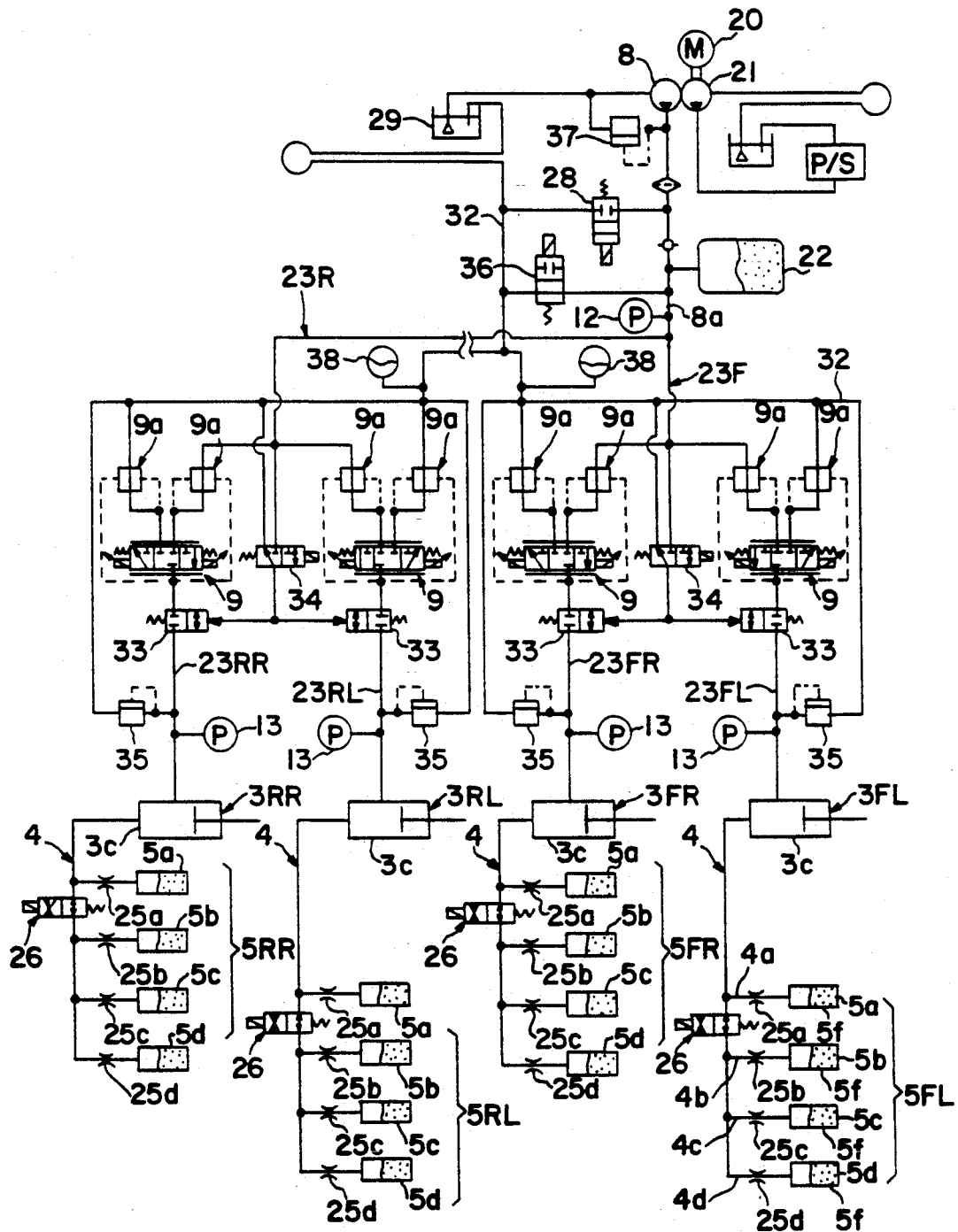
FIG. 2 is a circuit diagram showing a hydraulic pressure circuit for supplying the operating fluid to or discharging it from the fluid cylinder units.

FIG. 2 illustrates the hydraulic pressure circuit for controlling the supply of the operating fluid to the fluid cylinder unit 3 from the hydraulic pump 8 or the discharge thereof from the fluid cylinder unit 3.

As shown in FIG. 2, the hydraulic pump 8 is connected in a position parallel to a hydraulic pump 21 for a power steering apparatus to be drivable by a power plant 20. To a discharge tube 8a for discharging the fluid to the fluid cylinder unit 3 from the hydraulic pump 21 is communicated an accumulator 22 and the discharge tube 8a in turn is branched at a portion downstream of the connection portion of the accumulator 22 into a pipe 23F on the front wheel side and a pipe 23R on the rear wheel side. The pipe 23F in the front wheel side is further divided on the side downstream of the branch portion from the pipe 23R on the rear wheel side into a left-hand branch pipe 23FL on the left-hand front wheel side and a right-hand branch pipe 23FR on the right-hand front wheel side. The left-hand branch pipe 23FL is communicated with the liquid pressure chamber 3c of the corresponding liquid cylinder unit 3FL and the right-hand branch pipe 23FR is communicated with the liquid pressure chamber 3c of the corresponding liquid cylinder unit 3FR. Likewise, the pipe 23R is branched on the side downstream of the branch portion into a left-hand branch pipe 23RL on the left-hand rear wheel side and a right-hand branch pipe 23RR on the right-hand rear wheel side. The left-hand branch pipe 23RL on the left-hand rear wheel side is communicated with the liquid pressure chamber 3c of the corresponding liquid cylinder unit 3RL while the right-hand branch pipe 23RR on the right-hand rear wheel side is communicated with the liquid pressure chamber 3c of the corresponding liquid cylinder unit 3RR.

Each of the gas springs 5FL, 5FR, 5RL, and 5RR connected to the corresponding liquid cylinder units 3FL, 3FR, 3RL, and 3RR has four gas spring members 5a, 5b, 5c and 5d. Each of the gas spring members 5a is then connected to the corresponding connecting passage 4 through a branched connecting passage 4a branched from the connecting passage 4. Each of the gas spring members 5b is likewise connected to the corresponding connecting passage 4 through a branched connecting passage 4b which is further branched from the connecting passage 4. Further, each of the gas spring members 5c is connected first to a branched connecting passage 4c and then to the corresponding connecting passage 4, the branch connecting passage 4c being branched from the connecting passage 4, while each of the gas spring members 4d is likewise connected to the connecting passage 4 through a branched connecting passage 4d branched therefrom. The branch connecting passages 4a, 4b, 4c and 4d of the respective gas spring members 5a, 5b, 5c and 5d are provided with orifices 25a, 25b, 25c and 25d, respectively. The basic functions of the suspension apparatus are achieved by the damping action of each of the orifices 25a, 25b, 25c and 25d and the buffer action of the gas filled in the gas chamber 5f of each of the gas spring members 5a, 5b, 5c and 5d, thereby reducing the high-frequency vibration to be applied to the vehicle body.

The connecting passage 4 extending between the first gas spring member 5a disposed in the position closest to each of the springs 5FL, 5FR, 5RL, and 5RR and the second gas spring member 5b disposed in the position adjacent the first gas spring member 5a is provided with a damping-force shifting valve 26 for shifting the damping force by adjusting the passage area of the connecting passage 4. The damping-force shifting valve 26 is so arranged as to assume two positions which include an open position in which the connecting passage 4 is opened and a contracted position for contracting or reducing the passage area of the connecting passage 4. FIG. 2 indicates the state in which the shifting valve 26 assumes the open position.

To the discharge tube 8a of the hydraulic pump 8 in the vicinity of the upstream side of the connection portion of the accumulator 22 is an unload relief valve 28.

The unload relief valve 28 is so constructed as to be shifted to its open position to thereby return the liquid discharged from the hydraulic pump 8 directly to a reserve tank 29 when the discharging pressure of the operating liquid measured by the discharge pressure gauge 12 is equal to or higher than an upper limit value, e.g. 160 kgf/cm$^2$, on the one hand, while it is shifted to its closed position to thereby supply the liquid to the accumulator 22 and retain the pressure-accumulating value of the hydraulic pressure of the accumulator 22 at a predetermined value when the discharge pressure thereof is lower than a predetermined lower limit value, e.g. 120 kgf/cm$^2$, on the other hand. This allows the operating liquid to be supplied to each of the liquid cylinder unit 3 in accordance with the pressure-accumulating force of the accumulator 22 retained at the predetermined pressure-accumulating value. FIG. 2 indicates the state in which the unload relief valve 28 assumes its closed position.

The hydraulic pressure circuit of the liquid cylinder unit 3 disposed to each of the wheels has the same construction, so that description which follows will be made of the hydraulic pressure circuit for the left-hand front wheel 2FL only and description of the others will be omitted herefrom for brevity of explanation.

The proportional flow rate control valve 9 disposed on the left-hand pipe 23FL on the left-hand front wheel side is composed of a three-way valve which is so constructed as to assume three positions: a closed position as shown in FIG. 2 for closing all ports, a supply position for opening the left-hand pipe 23FL so as to supply the hydraulic pressure, and a discharge position for communicating the left-hand pipe 23 FL on the left-hand wheel side with a return passage 32. FIG. 2 indicates the state in which the proportional flow rate control valve 9 assumes its closed position. Further, the proportional flow rate control valve 9 has a pair of pressure compensation values 9a and 9a which in turn are so disposed as to retain the liquid pressure of the liquid cylinder unit 3 to a predetermined value when the proportional flow rate control valve 9 is located in the supply position or in the discharge position.

The proportional flow rate control valve 9 is provided on the side of the fluid cylinder unit 3 with an opening/closing valve 33 of a type capable of opening or closing the left-hand pipe 23FL on the left-hand front wheel side in accordance with a pilot pressure. The opening/closing valve 33 allows the liquid pressure of an electromagnetic valve 34 to be introduced as the pilot pressure at the time when the electromagnetic valve 34 is opened so as to lead the liquid pressure of the left-hand front wheel pipe 23FL on the side of the hydraulic pressure pump 8 of the proportional flow rate control valve 9. The opening/closing valve 33 allows the proportional flow rate control valve 9 to control the supply or discharge of the operating liquid to or from the liquid cylinder unit 3 by opening the left-hand pipe 23FL on the front wheel side when the pilot pressure is equal to or higher than a predetermined value.

As shown in FIG. 2, reference numeral 35 denotes a relief valve for returning the operating liquid within the liquid pressure chamber 3c to the return passage 32 by opening it when the liquid pressure within the liquid pressure chamber 3c of the liquid cylinder unit 3 is elevated to an abnormal extent. Reference numeral 36 denotes a valve associated with an ignition key connected to the discharge tube 8a of the hydraulic pump 8 in the vicinity on the side downstream of the connection portion of the accumulator 22. This valve 36 is so arranged as to return the operating liquid accumulated within the accumulator 22 by opening the valve 23 when the ignition key is turned off, thereby releasing such a high pressure state. Reference numeral 37 denotes a pump relief valve for decreasing the discharge pressure by returning the discharged liquid within the hydraulic pressure pump 8 to the reserve tank 29 when the discharge pressure of the hydraulic pump 8 is elevated to an abnormal extent. Reference numeral 38 denotes a return accumulator disposed at the return passage 32 for accumulating the pressure when the operating liquid is discharged from the liquid cylinder unit 3.

Figure 3A:
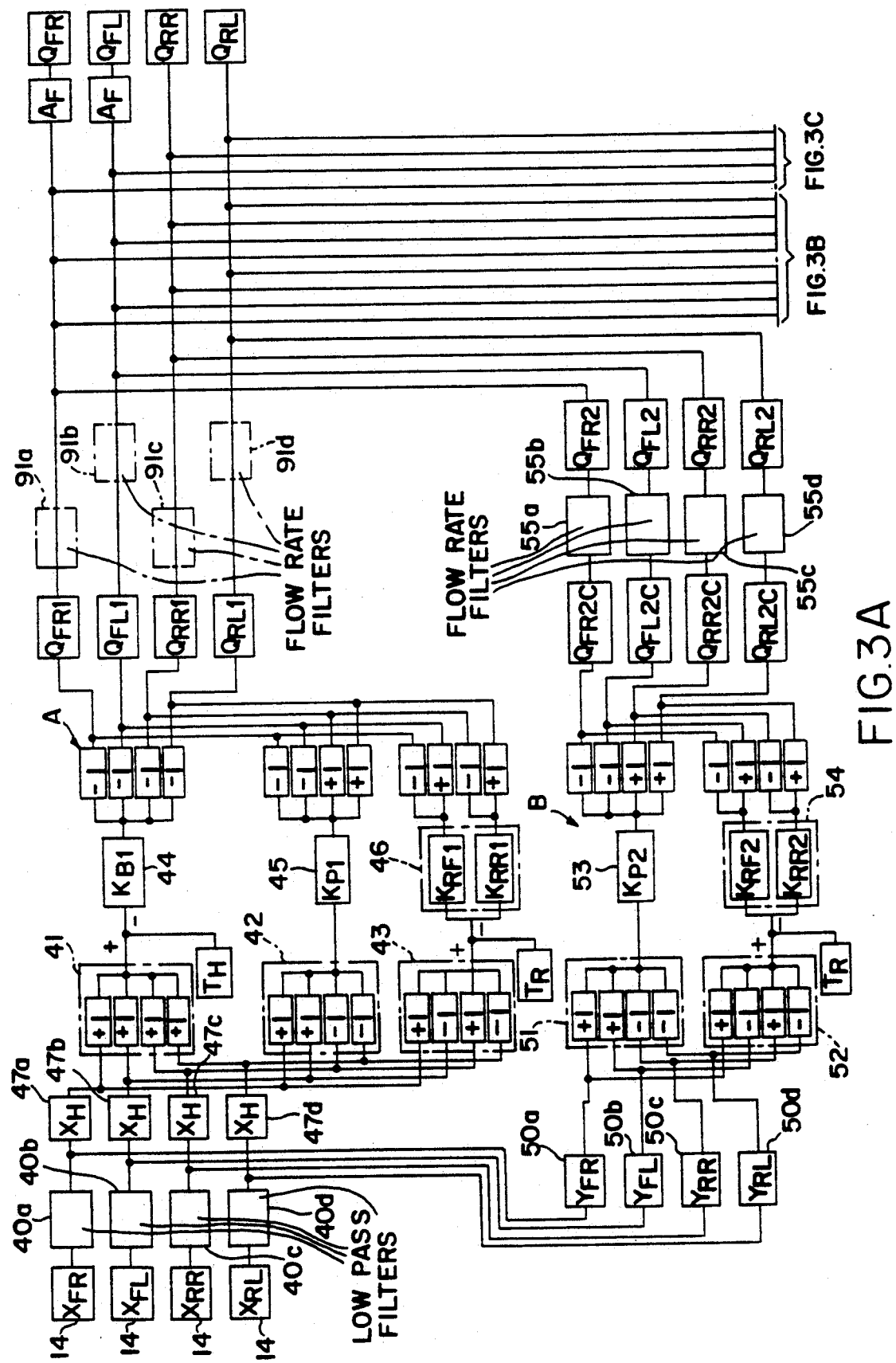

FIGS. 3(A), 3(B) and 3(C) are block diagrams showing a system disposed within the control unit 17 for calculating the amounts for controlling the fluid.

A fluid control amount calculating unit 100 for calculating an amount for controlling the fluid comprises a vehicle height control system A for controlling the vehicle height of the vehicle body, a vehicle-height displacement velocity control system B for controlling the displacement of the vehicle height of the vehicle body, a vertical vibration control system C for reducing vibration of the vehicle body in the vertical direction, a vehicle body twist control system D for suppressing a twist of the vehicle body, and a transverse acceleration control system E for decreasing vibration thereof in the transverse direction. The vehicle height control system A is to control the displacement of the vehicle height of the vehicle body to a target vehicle height on the basis of signals XFL, XFR, XRL, and XRR, indicative of the vehicle heights at the respective wheels, detected by and outputted from the vehicle height sensors 14, 14, 14 and 14, respectively. The vehicle-height displacement velocity control system B is to control the velocity at which the vehicle height of the vehicle body displaces, on the basis of signals YFL, YFR, YRL, and YRR, indicative of the velocity of displacing the vehicle body, obtained by differentiating the signals XFL, XFR, XRL, and XRR, respectively. The vertical vibration control system C is to reduce the vibration of the vehicle body in the vertical direction on the basis of signals GFR, GRL, and GR, indicative of acceleration in the vertical direction of the vehicle body, or in vertical acceleration, detected by and outputted from the respective vertical acceleration sensors 15, 15 and 15. The vehicle body twist control system D is to eliminate a twist of the vehicle body by operating the twist thereof on the basis of signals PFL, PFR, PRL, and PRR, indicative of the liquid pressure, detected by and outputted from the respective liquid pressure sensors 13, 13, 13 and 13 of the liquid cylinders 3. The transverse acceleration control system E is to reduce the vibration in the transverse direction of the vehicle body on the basis of signal GL, indicative of transverse acceleration, detected by the transverse acceleration sensor 16.

The vehicle height control system A is provided with low pass filters 40a, 40b, 40c and 40d for cutting the high-frequency components out of the vehicle height displacement signals XFL, XFR, XRL and XRR detected by the vehicle height sensors 14, 14, 14 and 14 for the respective wheels in order to cut noises out of those signals. In other words, the low pass filters 40a and 40b cut the high-frequency components out of the vehicle height displacement signals XFL and XFR outputted from the vehicle height sensors 14 and 14 located at the respective left-hand and right-hand front wheels 2FL and 2FR, while the low pass filters 40c and 40d cut the high-frequency components out of the vehicle height displacement signals XRL and XRR outputted from the vehicle height sensors 14 and 14 located at the respective left-hand and right-hand rear wheels 2RL and 2RR.

The vehicle height control system A comprises a bounce component operating section 41, a pitch component operating section 42, and a roll component operating section 43. The bounce component operating section 41 is to give a bounce component of the vehicle body by adding the sum of the signals XFL and XFR from which the high-frequency components have been removed, i.e., XFL+XFR, to the sum of the signals XRL and XRR from which the high-frequency components have been removed, i.e., XRL+XRR. The pitch component operating section 42 is to operate a pitch component of the vehicle body by subtracting the sum of the signals XRL and XRR on the rear wheel sides, i.e. XRL+XRR, from the signals XFL and XFR on the front wheel sides, i.e. XFL+XFR. The roll component operating section 43 is to operate a roll component of the vehicle body by adding the difference of the signals XFL and XFR on the rear wheel sides, i.e. XRL+XRR, to the difference of the signals XRL and XRR on the front wheel sides, i.e. XFL−XFR.

The vehicle height control system A comprises a bounce control section 44, a pitch control section 45, and a roll control section 46. The bounce control section 44 is provided with the bounce components of the vehicle body given by the bounce component operating section 41 and a target average vehicle height TH and it operates a control amount of fluid to be supplied to the fluid cylinder unit 3 for each wheel for controlling the bounce component on the basis of a gain KB1. The pitch control section 45 is provided with the pitch components of the vehicle body given by the pitch component operating section 42 and it operates a control amount of fluid to be supplied to the fluid cylinder unit 3 for each wheel for controlling the pitch component on the basis of a gain KP1. The roll components given by the roll component operating section 43 and a target roll displacement amount TR are inputted into the roll control section 46 for giving a control amount of the fluid to be supplied to the fluid cylinder unit 3 for each wheel on the basis of gains KRF1 and KRR1 for controlling the roll components so as to correspond to the target roll displacement amount TR.

The sign plus or minus of each of the control amounts given for each wheel by the respective bounce control section 44, the pitch control section 45 and the roll control section 46 is inverted into the opposite sign. In other words, each of the vehicle height displacement signals XFR, XFL, XRR and XRL detected by the vehicle height sensors 14, 14, 14 and 14 are processed so as to reverse their sign to the signs opposite to the sign detected thereby. Thereafter, the bounce, pitch and roll components for each wheel are added to each other, thereby giving control signals QFL1, QFR1, QRL1, and QRR1 for controlling the amount of fluid to be supplied to the proportional flow rate control valve 9 for each wheel.

Blind section units 47a, 47b, 47c and 47d are interposed, respectively, between the low pass filters 40a, 40b, 40c and 40d as well as the bounce, pitch and roll operating sections 41, 42 and 43, signals XFR, XFL, XRR and XRL inputted through the low pass filters 40a, 40b, 40c and 40d from the vehicle height sensors 14, 14, 14 and 14 are so arranged as to be fed to each of the bounce component operating section 41, the pitch component operating section 42 and the roll component operating section 43, only when the vehicle height displacement signals XFR, XFL, XRR and XRL have passed through the blind sections XH, XH, XH and XH, respectively.

The vehicle-height displacement velocity control system B comprises differentiators 50a, 50b, 50c and 50d for differentiating the vehicle height displacement signals XFR, XFL, XRR and XRL which have been inputted from the vehicle height sensors 14, 14, 14 and 14 and from which the high-frequency components are removed by the low pass filters 40a, 40b, 40c and 40d and by operating the vehicle height displacement velocity signals YFR, YFL, YRR and YRL according to the following formula:

$$Y = (Xn - Xn-1)/T$$

where

Xn is an amount of displacing the vehicle height at the time t:

Xn−1 is an amount of displacing the vehicle height at the time t−1; and

T is a sampling time.

The vehicle-height displacement velocity control system B comprises a pitch component operating section 51 and a roll component operating section 52. The pitch component operating section 51 is to operate the pitch component of the vehicle body by subtracting the sum of the vehicle-height displacement velocity signals YRL and YRR on the side of the left-hand and right-hand rear wheels 2RL and 2RR, i.e. YRL+YRR, from the sum of the vehicle-height displacement velocity signals YFL and YRL on the side of the left-hand and right-hand front wheels 2FL and 2FR, i.e. YFL+YFR. The roll component operating section 52 is to operate the roll component of the vehicle body by adding the difference of the vehicle height displacement velocity siganls YRL and YRR on the rear wheel side, i.e. YRL−YRR, to the difference of the vehicle height displacement velocity signals YFL and YFR on the front wheel side, i.e. YFL−YFR.

In the vehicle-height displacement velocity control system B, the pitch component calculated by the pitch component operating section 51 is inputted into the pitch control section 53 and a control amount for controlling the flow rate to each proportional flow rate control valve 9 for controlling the pitch component is operated on the basis of a gain KP2. On the other hand, the roll component calculated by the roll component operating section 52 is inputted into the roll control section 54 and a control amount for controlling the flow rate to each proportional flow rate control valve 9 is operated to reach the vehicle height of the vehicle body so as to correspond to a target roll amount TR on the basis of gains KRF2 and KRR2.

The sign plus or minus of each of the control amounts for each wheel produced by the respective pitch control sections 53 and 54 is inverted into the opposite sign. In other words, the vehicle height displacement velocity signals YFR, YFL, YRR and YRL operated by the differentiators 50a, 50b, 50c and 50d are processed so as to reverse their signs from plus or minus into their opposite signs. Then, the resulting pitch and roll control amounts for each of the wheels 2FL, 2FR, 2RL and 2RR are added, thereby giving flow rate operating signals QFL2c, QFR2c, QRL2c, and QRR2c, respectively, in the control system B.

The resulting flow rate operating signals QFL2c, QFR2c, QRL2c, and QRR2c, are inputted into flow rate filters 55a, 55b, 55c and 55d, respectively. The flow rate filters 55a, 55b, 55c and 55d each have a filter constant represented by:

$$1/(1+K \times Q_o \times S)$$

where

Qo is set to a value equal to the flow rate operating signal QFL2c, QFR2c, QRL2c or QRR2c when the flow rate operating signal QFL2c, QFR2c, QRL2c or QRR2c, respectively, is smaller than a predetermined value W2, on the one hand, and to a value equal to the predetermined value W2 when the flow rate operating signal QFL2c, QFR2c, QRL2c or QRR2c is equal to or larger than the predetermined value W2, on the other hand;

K is a constant; and

S is a Laplace's operator which gives a larger value as the frequency of vibration gets larger.

Hence, the filter constant becomes a smaller value as the frequency of vibration applied to the vehicle body gets larger, when each of the flow rate operating signals QFL2c, QFR2c, QRL2c, and QRR2c is smaller than the predetermined value W2 and when each of the flow rate operating signals QFL2c, QFR2c, QRL2c, and QRR2c gets larger. As a result, flow rate signals QFL2, QFR2, QRL2, and QRR2 to be generated to the respective proportional flow rate control valves 9 from the flow rate filters 55a, 55b, 55c and 55d become so small that an oscillating phenomenon can be prevented which may occur due to the fact that the flow rate signals QFL2, QFR2, QRL2, and QRR2 get larger, i.e. that a flow velocity of the fluid, or oil, gets higher. Further, since Qo is set to a value equal to the predetermined value W2 when the flow rate operating signals QFL2c, QFR2c, QRL2c, and QRR2c are equal to or larger than the predetermined value W2, the filter constant is determined exclusively by the Laplace's operator S when the flow rate operating signals QFL2c, QFR2c, QRL2c, and QRR2c are equal to or larger than the predetermined value W2. Since the filter constant does not become so small when vibration having a large amplitude is applied to the vehicle body in such a manner that a low-frequency vibration which should be subjected to suspension control accompanies a high-frequency vibration, the suspension control of such vibration can be performed in a desired degree of control sensitivity.

The vertical vibration control system C comprises a bounce component operating section 61, a pitch component operating section 62, and a roll component operating section 63. The vertical acceleration detecting signals GFR, GFL and GR detected by the vertical acceleration sensors 15, 15 and 15 from which the high-frequency components have been removed by the respective low pass filters 60a, 60b and 60c, are supplied to the bounce component operating section 61 which in turn is to give the bounce component of the vehicle body by adding vertical acceleration detecting signals GFL, GFR and GR for detecting acceleration in the vertical direction, detected by the respective vertical acceleration sensors 15, 15 and 15. The pitch component operating section 62 is to determine the pitch component of the vehicle body by subtracting output GR of the vertical acceleration sensor 15 located in a central portion in the widthwise direction between the left-hand and right-hand rear wheels from a half of the sum of the outputs GFR+GFL, i.e. (GFR+GFL)/2, from the vertical acceleration sensors 15 and 15 located in the positions above the respectively right-hand and left-hand front wheels. The roll component operating section 63 is to determine the roll component of the vehicle body by subtracting the output GFL from the vertical acceleration sensor 15 located on the left-hand front wheel side from the output GFR from the vertical acceleration sensor 15 located on the right-hand front wheel side.

The vertical acceleration control system C is further provided with a bounce control section 64, a pitch control section 65 and a roll control section 66. The bounce control section 64 is given the operated value of the bounce component operated by the bounce component operating section 61, thereby giving a control amount for controlling the fluid to be supplied to each proportional flow rate control valve 9 on the basis of a gain KB3 for controlling the bounce component. The operated value of the pitch component operated by the pitch component operating section 62 is inputted into the pitch control section 65 and a control amount of the fluid to be supplied to each proportional flow rate control valve 9 for controlling the pitch component is given on the basis of a gain KP3. The operated value of the roll component operated by the roll component operating section 63 is inputted into the roll control section 66, thereby giving a control amount of the fluid to be supplied to each proportional flow rate control valve 9 on the basis of gains KRF3 and KRR3 for controlling the pitch component.

The control amounts calculated by the bounce control section 64, the pitch control section 65 and the roll control section 66 in the manner as described hereinabove are then processed to reverse their signs plus or minus into their opposite signs for each wheel. Then, each of the control amounts for each corresponding wheel is added, thereby giving flow rate operating signals QFL3c, QFL3c, QRL3c, and QRR3c in the control system C.

Blind section units 67a, 67b and 67c are interposed, respectively, between the low pass filter 60a for cutting the high-frequency component out and the bounce component operating section 61, between the low pass filter 60b for cutting the high-frequency component out and the pitch component operating section 62, and between the low pass filter 60c for cutting the high-frequency component out and the roll component operating section 63. The vertical acceleration signal GFR is inputted through the low pass filter 60a from the vertical acceleration sensor 15 is fed to the bounce component operating section 61, the pitch component operating section 62 and the roll component operating section 63 only when the vertical acceleration signal GFR surpasses the blind section XG. Likewise, the vertical acceleration signal GFL inputted through the low pass filter 60b from the vertical acceleration sensor 15 is fed to the bounce, pitch and roll component operating sections 61, 62 and 63 only when the signal GFL surpasses the blind section XG. Further, the vertical acceleration signal GR inputted through the low pass filter 60c from the vertical acceleration sensor 15 is fed to the bounce, pitch and roll component operating sections 61, 62 and 63 only when the signal GR surpasses the blind section XG.

The resulting flow rate operating signals QFL3c, QFR3c, QRL3c, and QRR3c, are inputted into flow rate filters 68a, 68b, 68c and 68d, respectively. The flow rate filters 68a, 68b, 68c and 68d have each a filter constant as represented by:

$$1/(1+k \times Q_o \times S)$$

where

Qo is set to a value equal to the flow rate operating signal QFL3c, QFR3c, QRL3c or QRR3c when the flow rate operating signal QFL3c, QFR3c, QRL3c or QRR3c, respectively, is smaller than a predetermined value W3, on the one hand, and to a value equal to the predetermined value W3 when the flow rate operating signal QFL3c, QFR3c, QRL3c or QRR3c is equal to or larger than the predetermined value W3, on the other hand;

k is a constant; and

S is a Laplace's operator which gives a larger value as the frequency of vibration gets larger.

Hence, the filter constant becomes a smaller value as the frequency of vibration applied to the vehicle body gets larger, when each of the flow rate operating signals QFL3c, QFR3c, QRL3c and QRR3c is smaller than the predetermined value W3 and when each of the flow rate operating signals QFL3c, QFR3c, QRL3c and QRR3c gets larger. As a result, flow rate signals QFL3, QFR3, QRL3, and QRR3 to be generated to the respective proportional flow rate control valves 9 from the flow rate filters 68a, 68b, 68c and 68d become so small that an oscillating phenomenon can be prevented which may occur due to the fact that the flow rate signals QFL3, QFR3, QRL3, and QRR3 get larger, i.e. that a flow velocity of the fluid, or oil, gets higher. Further, since Qo is set to be equal to the predetermined value W3 when the flow rate operating signals QFL3c, QFR3c, QRL3c, and QRR3c are equal to or larger than the predetermined value W3, the filter constant is determined exclusively by the Laplace's operator S when the flow rate operating signal QFL3c, QFR3c, QRL3c or QRR3c is equal to or larger than the predetermined value W3. Since the filter constant does not become so small when vibration having a large amplitude is applied to the vehicle body in such a manner that a low-frequency vibration which should be subjected to suspension control accompanies a high-frequency vibration, the suspension control can be performed to control such vibration in a desired degree of sensitivity.

The control system D for eliminating the twist of the vehicle body comprises a warp control section 71 consisting of a front wheel liquid pressure ratio operating section 71a for operating a ratio of liquid pressure on the front wheel side and a rear wheel liquid pressure ratio operating section 71b for operating a ratio of liquid pressure on the rear wheel side. The liquid pressure detecting signals PFL and PFR detected by the liquid pressure sensors 13 and 13 for the fluid cylinder units 3 and 3 on the left-hand and right-hand front wheels 2FL and 2FR are inputted into low pass filters 70a and 70b, respectively, and the high-frequency components are cut out of the signals PFL and PFR by the respective low pass filters 70a and 70b. Thereafter, the resulting outputs PFL and PFR are inputted into the front wheel liquid pressure ratio operating section 71a which in turn gives a liquid pressure ratio Pf of the difference between the signals PFR and PFL of the respective liquid pressure chambers 3c and 3c of the fluid cylinder units 3 and 3 for the right-hand and left-hand front wheels 2FR and 2FL to the sum of the liquid pressure signals PFR and PFL, i.e. Pf=(PFR−PFL)/(PFR+PFL). Further, the front wheel liquid pressure ratio operating section 71a generates the resulting liquid pressure ratio Pf as it is when the resulting liquid pressure ratio Pf is larger than a threshold liquid pressure ratio −ωL yet smaller than +ωL, on the one hand, and it generates the threshold liquid pressure ratio −ωL or +ωL when the liquid pressure ratio Pf is smaller than −ωL or when it is larger than +ωL, on the other hand. Likewise, the liquid pressure detecting signals PRL and PRR detected by the liquid pressure sensors 13 and 13 for the fluid cylinder units 3 and 3 on the left-hand and right-hand rear wheels 2RL and 2RR are inputted into low pass filters 70c and 70d, respectively, and the high-frequency components are cut out of the signals PRL and PRR by the respective low pass filters 70c and 70d. Thereafter, the resulting outputs PRL and PRR are inputted into the rear wheel liquid pressure ratio operating section 71a which in turn gives a liquid pressure ratio Pr of the difference between the signals PRR and PRL of the respective liquid pressure chambers 3c and 3c of the fluid cylinder units 3 and 3 for the right-hand and left-hand rear wheels 2RR and 2RL to the sum of the liquid pressure signals PRR and PRL, i.e. Pr=(PRR−PRL)/(PRR+PRL). The warp control section 71 multiplies the liquid pressure ratio Pr on the rear wheel side to predetermined times using a gain ωF and then subtracts the resulting product from the liquid pressure ratio Pf on the front wheel side. Further, the output from the warp control section 71 is multiplied by using a gain ωA. Thereafter, the output on the front wheel side multiplied by using the gain ωA is further multiplied by using a gain ωC. Then, the resulting control amount of the fluid to be supplied to each wheel is processed so as to cause its sign plus or minus to be opposite to each other between the left-hand and right-hand wheels, thereby giving flow rate signals QFL4, QFR4, QRL4, qnd QRR4.

In the transverse acceleration control system E, the transverse acceleration detecting signal GL, indicative of acceleration in the transverse direction of the vehicle body, detected by the transverse acceleration sensor 16, is inputted into a low pass filter 80 and the high-frequency component is cut out of the transverse acceleration detecting signal GL by the low pass filter 80, followed by operating a control amount on the basis of a gain Kg. The control amounts for the left-hand and right-hand front wheels 2FL and 2FR are further multiplied on the basis of a gain AGF. Thereafter, the control amount of the fluid to be supplied to the left-hand front wheel 2FL is treated so as to reverse its sign plus or minus into its opposite sign, thereby reversing the signs of the control amounts of the fluid to be supplied to the left-hand and right-hand front wheels from each other. For the left-hand and right-hand rear wheels 2RL and 2RR, on the other hand, the sign plus or minus of the control amount of the fluid to be supplied to the left-hand rear wheel 2RL is reversed into its opposite sign so as to reverse the signs of the control amounts of the fluid to be supplied to the left-hand and right-hand rear wheels from each other. As a result, there are provided flow rate operating signals, thereby giving flow rate signals QFL5c, QFR5c, QRL5c, and QRR5c for the transverse acceleration control system E.

The resulting flow rate operating signals QFL5c, QFR5c, QRL5c, and QRR5c, are inputted into flow rate filters 81a, 81b, 81c and 81d, respectively. The flow rate filters 81a, 81b, 81c and 81d have each a filter constant as represented by:

$$1/(1+k \times Q_o \times S)$$

where
- $Q_o$ is set to a value equal to the flow rate operating signal QFL5c, QRL5c, QRL5c or QRR5c when the flow rate operating signal QFL5c, QFR5c, QRL5c or QRR5c, respectively, is smaller than a predetermined value W5, on the one hand, and to a value equal to the predetermined value W5 when the flow rate operating signal QFL5c, QFR5c, QRL5c or QRR5c is equal to or larger than the predetermined value W5, on the other hand;
- k is a constant; and
- S is a Laplace's operator which gives a larger value as the frequency of vibration gets larger.

Hence, the filter constant becomes a smaller value as the frequency of vibration applied to the vehicle body gets larger, when the flow rate operating signals QFL5c, QFR5c, QRL5c, and QRR5c are smaller than the predetermined value W5 and when the flow rate operating signals QFL5c, QFR5c, QRL5c, and QRR5c get larger. As a result, flow rate signals QFL5, QFR5, QRL5, and QRR5 to be generated to the respective proportional flow rate control valves 9 from the flow rate filters 81a, 81b, 81c and 81d become so small that an oscillating phenomenon can be prevented which may occur due to the fact that the flow rate signals QFL5, QFR5, QRL5, and QRR5 get larger, i.e. that a flow velocity of the fluid, or oil, gets higher. Further, since $Q_o$ is set to be equal to the predetermined value W5 when the flow rate operating signals QFL5c, QFR5c, QRL5c, and QRR5c are equal to or larger than the predetermined value W5, the filter constant is determined exclusively by the Laplace's operator S when the flow rate operating signals QFL5c, QFR5c, QRL5c, and QRR5c are equal to or larger than the predetermined value W5. Since the filter constant does not become so small when vibration having a large amplitude is applied to the vehicle body in such a manner that a low-frequency vibration which should be subjected to suspension control accompanies a high-frequency vibration, the suspension control of such vibration can be performed in a desired degree of sensitivity to control.

The flow rate signals for controlling the flow rate to each proportional flow rate control valve 9 in the control systems A, B, C, D and E are added for each wheel, and the flow rate signals for the left-hand and right-hand front wheels 2FL and 2FR are further multiplied by a gain AF, thereby giving total flow rate signals QFR, QFL, QRR and QRL for supplying the fluid to each proportional flow rate control valve 9 for the respective wheels.

Table below shows an example of reference maps stored in the control unit 17 for control gains to be employed for each of the control systems A, B, C, D and E and the map shown in the Table below sets seven modes in accordance with the travelling states in which the automotive vehicle is travelling.

TABLE

| Control Gain | Modes 1 | 2 | 3 | 4 | 5 | 6 | 7 | Unit |
|---|---|---|---|---|---|---|---|---|
| KB1 | 0.02 | 0.02 | 0.02 | 0.02 | 0.02 | 0.02 | 0.02 | L/mm |
| KP1 | 0.02 | 0.02 | 0.02 | 0.02 | 0.02 | 0.02 | 0.02 | L/mm |
| KRF1 | 0.04 | 0.04 | 0.04 | 0.04 | 0.04 | 0.04 | 0.04 | L/mm |
| KRR1 | 0 | 0 | 0 | 0 | 0 | 0 | 0 | L/mm |
| KP2 | 0 | 0.5 | 0 | 0 | 0 | 0 | 0 | L(mm/sec) |
| KRF2 | 0 | 0 | 0 | 0.03 | 0.05 | 0.05 | 0.07 | L/(mm/sec) |
| KRR2 | 0 | 0 | 0 | 0.03 | 0.05 | 0.05 | 0.07 | L/(mm/sec) |
| KB3 | 5 | 20 | 10 | 12 | 15 | 15 | 15 | L/G |
| KP3 | 5 | 20 | 10 | 12 | 15 | 15 | 15 | L/G |
| KRF3 | 5 | 15 | 15 | 20 | 20 | 30 | 40 | L/G |
| KRR3 | 5 | 15 | 15 | 20 | 20 | 30 | 40 | L/G |
| Kg | 0 | 0 | 0 | 5 | 10 | 15 | 20 | L/G |
| AGF | 0 | 0 | 0 | 1 | 1.05 | 1.1 | 1.15 | — |
| $\omega A$ | 250 | 250 | 250 | 250 | 250 | 350 | 350 | — |
| $\omega F$ | 1 | 1 | 1 | 1 | 1 | 1.2 | 1.2 | — |
| $\omega L$ | 0.5 | 0.5 | 0.5 | 0.5 | 0.5 | 0.5 | 0.5 | — |
| $\omega C$ | 1 | 1 | 1 | 1 | 1 | 1 | 1 | — |
| XH | 5 | 1 | 1 | 1 | 1 | 5 | 5 | mm |
| XG | 0.05 | 0 | 0 | 0 | 0 | 0 | 0 | G |
| AF | 1 | 1 | 1 | 1 | 1.05 | 1.1 | 1.15 | — |
| Qmax | 5 | 15 | 15 | 15 | 15 | 15 | 15 | L |
| Pmax | 110 | 110 | 110 | 110 | 110 | 110 | 110 | Kgf/cm$^2$ |
| Pmin | 30 | 30 | 30 | 30 | 30 | 30 | 30 | Kgf/cm$^2$ |
| TH | 0 | 0 | 0 | 0 | 0 | 0 | 0 | mm |
| TR | 0 | 0 | 0 | 10 | 0 | 5 | 3 | mm |

Note: L = liter/minute

In Table above, Mode 1 refers to a value of each control gain for 60 seconds after the combustion engine has been stopped; Mode 2 refers to a value of each control gain in such a state that an ignition switch is turned on yet the vehicle speed is zero; Mode 3 refers to a value of each control gain selected when the vehicle speed is equal to 40 kilometers per hour or slower; Mode 4 refers to a value of each control gain in a reverse roll mode selected by a roll-mode selecting switch (not shown) when the vehicle speed is faster than 30 kilometers per hour yet equal to or slower than 60 kilometers per hour and when the automotive vehicle is cornering slowly at the transverse acceleration GL as low as 0.3 or lower, however, Mode 4 is so arranged as to be switched automatically to Mode 3, 5 or 6 even if the reverse roll mode is chosen when the vehicle speed and the transverse acceleration GL are outside the above ranges; Mode 5 refers to a value of each control gain in a state that the automotive vehicle is cornering slowly at an intermediate vehicle speed as high as faster than 40 kilometers per hour but equal to or slower than 80 kilometers per hour and at the transverse acceleration GL as high as 0.2 or lower; Mode 6 refers to a value of each control gain in a state that the automotive vehicle is cornering at an intermediate vehicle speed as high as 40 kilometers per hour but equal to or slower than 80 kilometers per hour and at the intermediate or high transverse acceleration GL as high as 0.2; and Mode 7 refers to a value of each control gain when the automotive vehicle is travelling at a high speed exceeding 80 kilometers per hour. The control gain Qmax denotes a maximum control amount of the fluid to be supplied to the proportional flow rate control valve 9 for each wheel. The control gain Pmax denotes a maximum pressure within the liquid pressure chamber 3c of the fluid cylinder unit 3 and it is so set as for the fluid to cause no backward flow from the liquid pressure chamber 3c of the fluid cylinder unit 3 into the accumulator 22. The control gain Pmin stands for a minimum pressure within the liquid pressure chamber 3c of the fluid cylinder unit 3 and it is so set as not to cause the pressure within the liquid pressure chamber 3c of the fluid cylinder unit 3 to be reduced to an excessive extent, thereby causing gas spring 5 not to be extended to an excessive extent and to break.

In the Table above, it is to be noted that each of the control gains is so set as to perform the suspension control which places more emphasis upon travelling stability as the mode number gets larger except for Mode 4.

Given the following, description will now be made of the correction of a flow rate for controlling the roll of the vehicle body corresponding to the inner cylinder pressure with reference to FIG. 4.

The description of FIGS. 3(A), 3(B) and 3(C) is directed to a basic control of the posture of the vehicle body, in which the final basic control amounts QFR, QFL, QRR and QRL are corrected to control the roll so as to correspond to the inner cylinder pressure. In this description, the control only for suppressing the roll of the vehicle body is taken into account for brevity of explanation, with all the other control of the posture of the vehicle body set aside. In this case, it can be understood that the symbols, plus (+) and minus (−), for the final basic control amounts QFR and QFL are opposite to each other, meaning that the difference resides merely in the supply of the operating fluid or the discharge of the operating fluid. The absolute figures are the same between them. Likewise, the symbols for the final basic control amounts QRR and QRL are opposite to each other, although their absolute values are identical to each other. Therefore, description will be made only of the front wheel side, however, the description can likewise be applied to the description on the rear wheel side.

Figure 4:
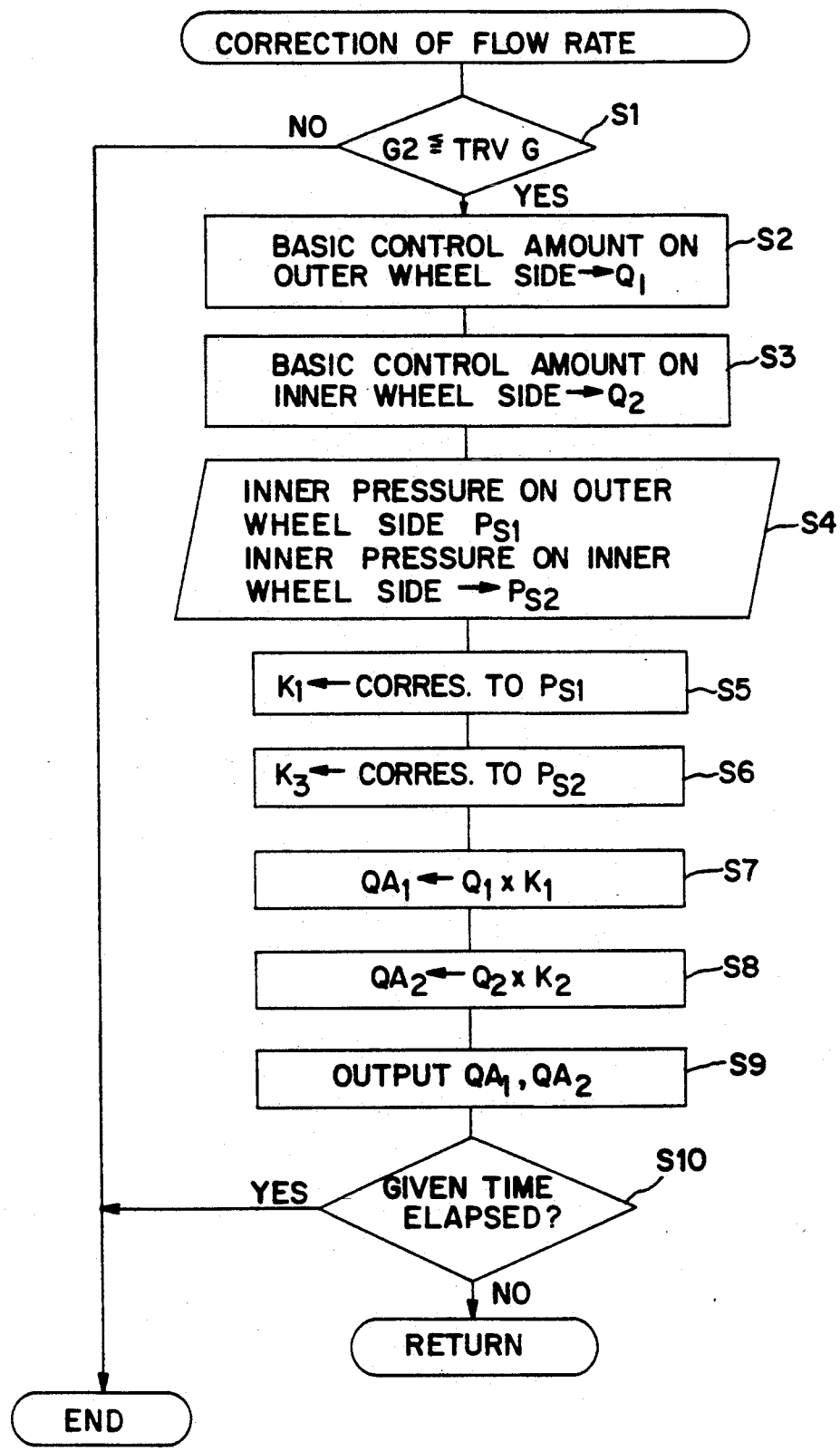
FIG. 4 is a flow chart showing an example of correcting a flow rate for controlling a roll of the vehicle body.

Referring to FIG. 4, a decision is made at step S1 to determine if the magnitude of transverse acceleration detected by the transverse acceleration sensor (the transverse G sensor) 16 is equal to or larger than G2. When it is decided that the transverse acceleration detected by the transverse G sensor 16 is smaller than G2, this program ends because it is determined that the automotive vehicle is not cornering rapidly so that no correction for the flow rate is required.

On the other hand, the yes result of the decision at step S1 indicates that the transverse acceleration detected by the sensor 16 is larger than or equal to G2, and then the program flow goes to step S2. In step S2, the final basic control amount for the wheel on the outer wheel side upon cornering, for example, QFR, is set to Q1. Then, at step S3, the final basic control amount for the wheel on the inner wheel side upon cornering, for example, QFL, is set to Q2.

The program flow then goes to step S4 at which the inner cylinder pressure for the cylinder on the outer wheel side upon cornering, for example, 3FR, is set to $Ps_1$, while the inner cylinder pressure for the cylinder on the inner wheel side upon cornering, for example, 3FL, is set to $Ps_2$.

Then, at step S5, a correction coefficient K1 corresponding to the inner pressure Ps1 for the cylinder on the outer wheel side is set. The correction coefficient K1 is given by the following equation:

$$K1 = \frac{1}{P_{S1}^{1.71}}$$

The program flow then goes to step S6 at which the correction coefficient K2 corresponding to the inner pressure Ps2 for the cylinder on the inner wheel side is set. The correction coefficient K2 is given by the following equation:

$$K2 = \frac{1}{P_{S2}^{1.71}}$$

Then, at step S7, a control amount QA1 after correction is computed by multiplying the final basic control amount Q1 on the outer wheel side by the correction coefficient K1, followed by proceeding to step S8 at which a control amount QA2 after correction is computed by multiplying the final basic control amount Q2 on the inner wheel side by the correction coefficient K2.

Further, at step S9, the control amounts QA1 and QA2 are generated to the corresponding flow rate control valves, thereby supplying the operating fluid to the cylinder on the outer wheel side in the quantity corresponding to the control amount QA1 and discharging the operating fluid from the corresponding cylinder on the inner wheel side in the quantity corresponding to the control amount QA2.

Then, at step S10, a decision is made to determined if a given time has been elapsed from the time when it was decided at step S1 that the transverse acceleration detected by the sensor 16 was larger than or equal to G2. When it is decided at step S10 that the given time has not been elapsed yet, then the program flow goes to step S1. On the other hand, when the result of decision at step S10 indicates that the given time has been elapsed, then the program is ended as it is, concluding the correction.

It is noted herein that, as the inner pressure Ps1 for the cylinder on the outer wheel side is larger than the inner pressure Ps2 for the cylinder on the inner wheel side, the correction coefficient K1 is smaller than the correction coefficient K2. Thus, as long as the final control amount Q1 on the outer wheel side is equal to the final control amount Q2 on the inner wheel side, the control amount QA1 is smaller than the control amount QA2.

Figure 5:
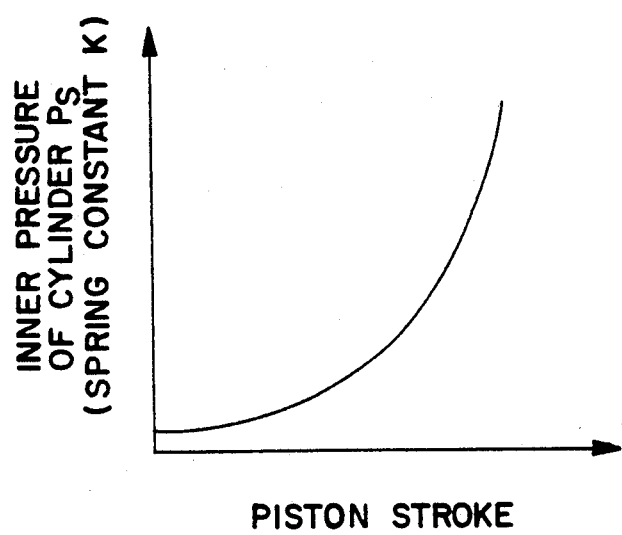
FIG. 5 is a graph showing the relationship of a piston stroke of the cylinder unit via inner cylinder pressure.

Further, it is to be noted that, as the relationship of the piston stroke of each of the cylinders 3FL, 3FR, 3RR and 3RL versus the spring constant is shown, for example, in FIG. 5, the equation for setting the correction coefficients K1 and K2 is set with the characteristic as shown in FIG. 5 taken into account. Hence, it is to be noted that the aforesaid equations may appropriately be altered in accordance with alteration of the characteristic as shown in FIG. 5, such as volumes or pressures of the gas springs 5a, 5b, 5c and 5d, or the like. Furthermore, the processing at step S10 is to perform correction in the initial stage of cornering only, so that it can be omitted.

Although the correction of the flow rate as shown in FIG. 4 is performed for the final basic control amounts, there may also be corrected a flow rate obtainable by the control relating to the control of the roll, among the control over the basic posture, such as the flow rate obtainable by only the control of the roll as shown in FIG. 3(A) (only the control shown by reference numeral 46 or the control shown by reference numeral 46 and the control shown by reference numeral 54).

It can be noted, too, that the correction of the flow rates as described with reference to FIG. 4 may be performed even when the automotive vehicle is cornering slowly, in addition when the automotive vehicle is cornering rapidly. in other words, the flow rates may be corrected during slow cornering where the magnitude of the transverse acceleration sensed by the transverse G sensor is smaller than G2 yet equal to or larger than G1. In addition, the flow rates may be corrected in any case where the automotive vehicle is cornering, whether it is cornering rapidly or slowly. Further, the magnitude of the transverse acceleration may be determined using a steered angle of the steering wheel, a vehicle speed, or the like, as a parameter. In this case, it may be noted that the larger than steered angle the greater the automotive vehicle is cornering to an extent, as long as the vehicle speed is the same, or the higher the vehicle speed the greater the automotive vehicle is cornering to an extent, as long as the steered angle is the same.

It is to be noted further that the flow rate may be corrected in the manner as shown in FIG. 4 only when the target rolling angle is made the reverse rolling angle as in the mode 4 in the Table above.

It is to be understood as a matter or course that the present invention is construed as being not limitative to the embodiments as described hereinabove but encompassing various changes and modifications within the spirit and the scope of the invention.

Further, the embodiments described above contain the control systems A, B, C, D and E, however, at least either one of the control systems B, C, D or E is needed in addition to the control system A. Although the flow rate filter is disposed only in the control systems B, C and E, it may be disposed in the control system A and/or the control system D, too (refer to 91a–91d; 92a–92d).

It is further to be noted that each of the means does not necessarily refer to physical one and that the present invention is construed as encompassing the case where the function of each means can be realized by software means or where the functions of the plural means can be realized by one physical means or where the function of one means can be realized by plural physical means.

It is to be understood that the foregoing text and drawings relate to embodiments of the present invention given by way of examples but not limitation. Various other embodiments and variants are possible within the spirit and scope of the present invention.

What is claimed is:

1. A suspension system for an automotive vehicle, comprising:
   a cylinder unit interposed independently and separately between a vehicle body and each of the wheels so as to adjust a vehicle height of the vehicle body in accordance with supply or discharge of operating fluid;
   flow rate adjusting means for supplying or discharging the operating fluid to or from the cylinder unit;
   roll controlling means for generating a control value to the flow rate adjusting means so as to allow an actual angle of a roll of the vehicle body to agree with a target angle of the roll of the vehicle body;
   inner-pressure detecting means for detecting an inner pressure of the cylinder unit;
   cornering detecting means for detecting cornering of the automotive vehicle; and
   correcting means for correcting the control value so as to make a quantity of the operating fluid to be supplied or to be discharged become smaller as the inner pressure detected by the inner pressure detecting means becomes larger, when the cornering of the automotive vehicle is detected by the cornering detecting means.

2. A suspension system as claimed in claim 1, wherein:
   the cornering detecting means is to detect rapid cornering of the automotive vehicle; and
   the correcting means corrects said control value only when the automotive vehicle is cornering rapidly.

3. A suspension system as claimed in claim 2, wherein:
   the cornering detecting means contains a transverse acceleration sensor for detecting transverse acceleration acting upon the vehicle body in the transverse direction; and
   the cornering detecting means detects the rapid cornering of the automotive vehicle when the transverse acceleration detected by the transverse acceleration sensor is equal to or larger than a predetermined value.

4. A suspension system as claimed in claim 1, wherein the cornering detecting means further comprises:
   a transverse acceleration sensor for detecting transverse acceleration acting upon the vehicle body; and determining means for determining if the transverse acceleration detected by the transverse acceleration sensor is equal to or larger than a predetermined value.

5. A suspension system as claimed in claim 1, wherein the correcting means further comprises:
   correction coefficient setting means for setting a correction coefficient to become a smaller value as the inner pressure detected by the inner pressure detecting means becomes larger; and
   multiplying means for multiplying the control value set by the correction coefficient.

6. A suspension system as claimed in claim 1, further comprising:
   vehicle height detecting means disposed at each of the wheels for detecting the vehicle height of the vehicle body at each of the wheels;
   wherein the roll controlling means determines the control value so as to allow the actual angle of the roll of the vehicle body obtainable on the basis of the vehicle height detected by each vehicle height detecting means to agree with the target angle of the roll thereof.

7. A suspension system as claimed in claim 1, wherein the target angle of the roll of the vehicle body is set to zero or to substantially zero.

8. A suspension system as claimed in claim 1, wherein correcting the control value by the correcting means is made only in an initial stage of said cornering.

9. A suspension system as claimed in claim 1, wherein the target angle of the roll of the vehicle body is set to an inverse angle of the roll so as to make the vehicle height of the vehicle body on an outer wheel side upon cornering higher than the vehicle height thereof on an inner wheel side upon cornering.

10. A suspension system as claimed in claim 1, wherein:
   the target angle of the roll of the vehicle body is set to an inverse angle of the roll thereof only when the automotive vehicle is travelling in a predetermined travelling state; and
   the target angle of the roll of the vehicle body is set to become a positive angle of the roll to make the vehicle height on the outer wheel side upon cornering lower than the vehicle height on the inner wheel side upon cornering, when the automotive vehicle is travelling in a state other than the predetermined travelling state.

11. A suspension system as claimed in claim 10, wherein the predetermined travelling state is set by using a vehicle speed and transverse acceleration as parameters.

12. A suspension system as claimed in claim 1, further comprising:
   vehicle height detecting means disposed at each of the wheels for detecting the vehicle height of the vehicle body at each of the wheels;
   bounce controlling means for determining a first control value so as to allow a bouncing state of the vehicle body obtainable on the basis of the vehicle height detected by each of the vehicle height detecting means to agree with a predetermined target vehicle height; and
   pitch controlling means for determining a second control value so as to suppress a pitch of the vehicle body obtainable on the basis of the vehicle height detected by each of the vehicle height detecting means;
   wherein the roll controlling means is set to determine a third control value so as to allow said actual angle of a roll of the vehicle body obtainable on the basis of the vehicle height detected by each of the vehicle height detecting means to agree with the target angle of the roll thereof.

13. A suspension system as claimed in claim 12, wherein the correcting means is to correct the sum of the first control value, the second control value and the third control value.

14. A suspension system as claimed in claim 1, further comprising:
   displacement-speed detecting means for detecting a speed of displacement at which the vehicle height of the vehicle body displaces; and
   displacement-speed controlling means for controlling the flow rate adjusting means so as to minimize the speed of displacement to be detected by the displacement-speed detecting means.

15. A suspension system as claimed in claim 1, further comprising:
   vertical acceleration detecting means for detecting vertical acceleration acting upon the vehicle body in its vertical direction; and
   vertical acceleration controlling means for controlling the flow rate adjusting means so as to suppress the vertical acceleration detected by the vertical acceleration detecting means.

16. A suspension system as claimed in claim 1, further comprising:
   twist detecting means for detecting force of a twist between a forward portion and a rearward portion of the vehicle body; and
   twist controlling means for controlling the flow rate adjusting means so as to minimize the force of the twist detected by the twist detecting means.

17. A suspension system as claimed in claim 1, further comprising:
   transverse vibration detecting means for detecting transverse vibration acting upon the vehicle body in its transverse direction; and
   transverse vibration controlling means for controlling the flow rate adjusting means so as to suppress the transverse vibration detected by the transverse vibration detecting means.

18. A suspension system as claimed in claim 1, further comprising:
   vehicle body controlling means for determining a further control value for the flow rate adjusting means on the basis of the roll controlling means;
   wherein the correcting means corrects the sum of the control value determined by the roll controlling means and the further control value determined by the vehicle body controlling means.

* * * * *